July 1, 1958 F. C. WILDEMAN 2,840,918
MAGNETIC SURFACE GAUGE
Filed Nov. 21, 1955 2 Sheets-Sheet 2
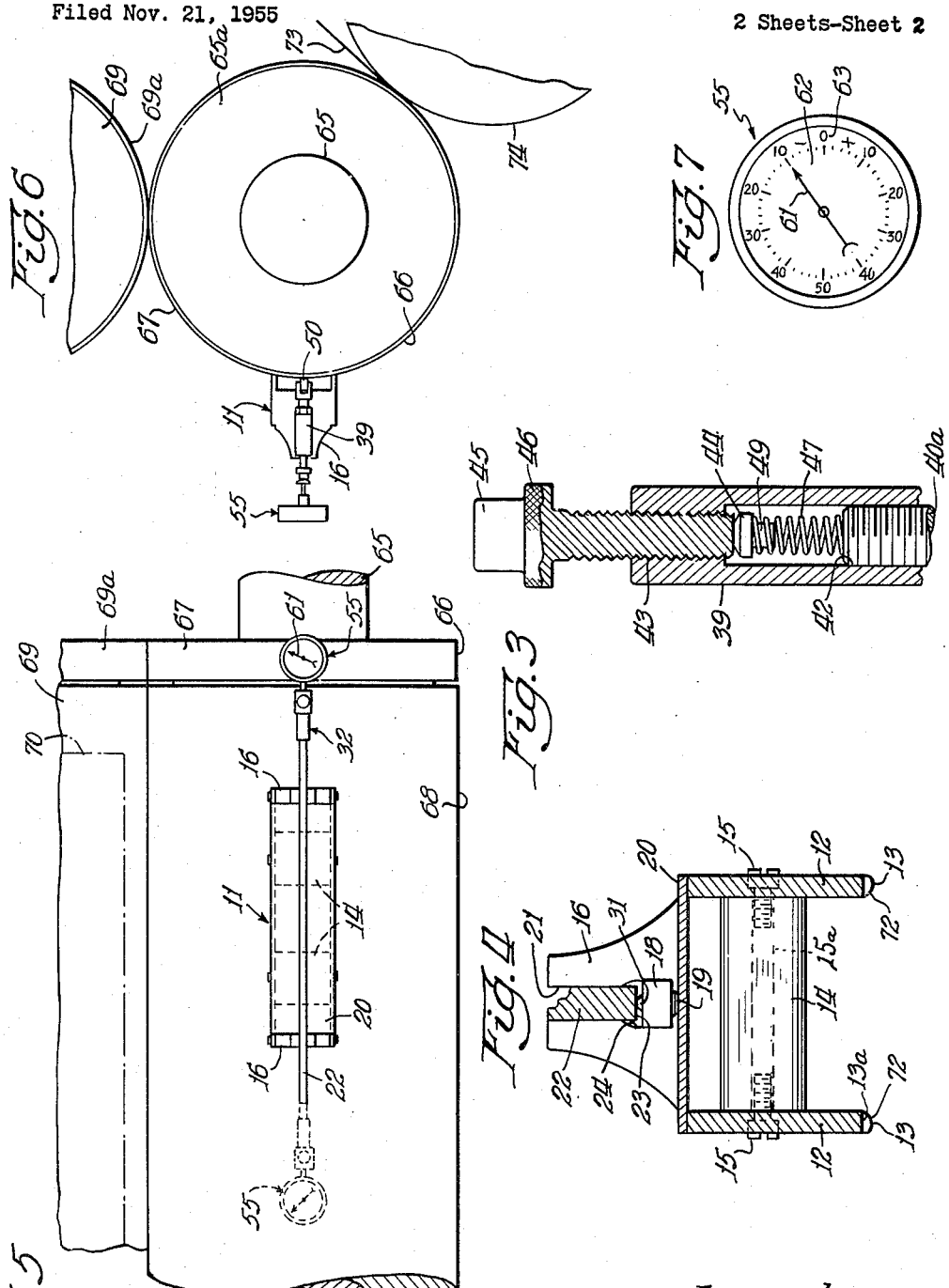
Inventor:
Fredric C. Wildeman
By: Jones, Tesch & Darbo
Attys.

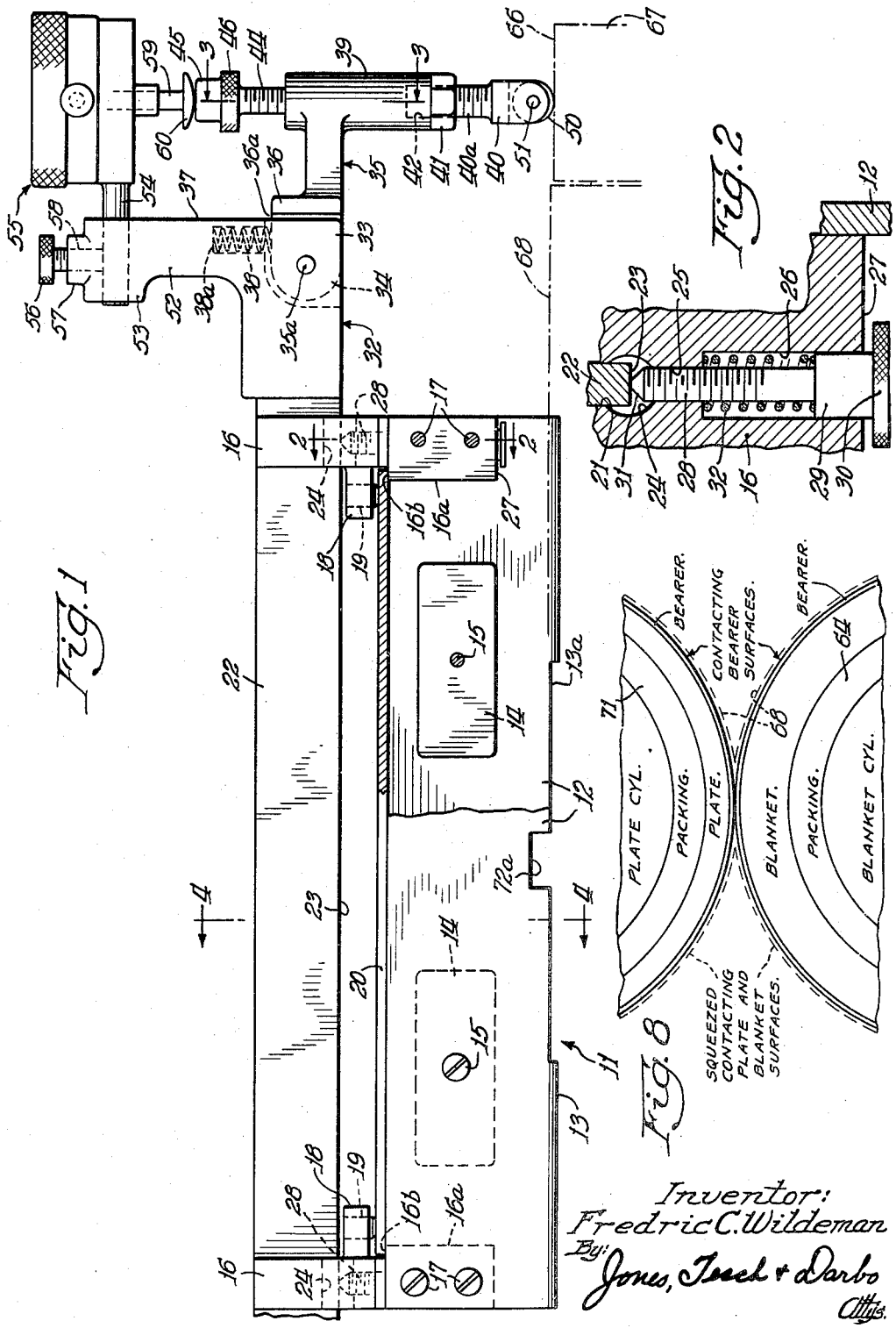

United States Patent Office 2,840,918
Patented July 1, 1958

2,840,918

MAGNETIC SURFACE GAUGE

Fredric C. Wildeman, Madison, Wis.

Application November 21, 1955, Serial No. 548,114

14 Claims. (Cl. 33—172)

This invention relates to a magnetic surface gauge or the like and more particularly for use with offset printing presses to determine the correctness of the packings on the plate and blanket cylinders of the press.

It is well known that the plate and blanket cylinders of an offset printing press are packed with paper or the like so that the cylinders are of equal diameter say, and so that about .004 inch excess diameter is provided, that is say .002 on each of the plate and blanket cylinders to provide a printing pressure therebetween that will assure good contact so that the plate cylinder, with its inked plate, when rolling against the blanket cylinder, will transfer a good printing image, for subsequent delivery by the blanket cylinder to the paper upon which the ultimate impression is to be made.

It is well known also that the cylinders have annular rings or bearers at each end by which the cylinders make contact one with the other, or in other words upon which they roll. It is common practice to pack a cylinder to a diameter slightly in excess of the bearer diameter, which excess, as already alluded to above, may be approximately .002 inch. A good pressman usually wants to check the packing thickness before he proceeds with the printing job, and the present invention provides a device by which the pressman may take such measurement on the press itself and just before proceeding to start the run. He can do this if he can measure the height of the plate or blanket surface, as the case may be, above its bearer surface.

Since the cylinders are related one above the other, the present invention provides a device which holds itself to the cylinder in somewhat cantilever fashion against the action of gravity and which securely retains its position on the cylinder until the measurements have been completed, thus assuring accuracy and uniformity of result, and for this purpose the invention includes a magnetic base or bridge member that attaches itself by electrical magnetism to the cylinder, the latter having normally a steel structure to which the magnet of the bridge member is attracted.

The invention also desirably includes a separable and movable bar mounted on the bridge member through the intermediation of non-magnetic rests, the bar being longer than the bridge member and carrying at one end a dial indicator and a resilient finger cooperating with the indicator, the finger being successively contacted with, say, first, the surface of the bearer, and then (by reversing the bar on the bridge member) the surface of the plate or blanket as the case may be to determine the relative difference in height of the bearer and cylinder surfaces or, in other words, to determine whether the predetermined optimum of say .002 inch excess height plate or blanket surface over the bearer surface has been maintained.

The invention will be further explained by reference to the following description, taken together with the accompanying drawings, of an illustrative embodiment thereof, and in which drawings—

Figure 1 is a longitudinal elevation view, which may be approximately full size, broken off at one end to save space, and partly in section, of a device embodying the present invention;

Figure 2 is an enlarged partial cross-sectional view taken on the line 2—2 of Fig. 1;

Figure 3 is another somewhat enlarged cross-section taken on the line 3—3 of Fig. 1;

Figure 4 is a cross-section taken on the line 4—4 of Fig. 1 and on the scale thereof;

Figure 5 is a front elevational view of a plate and blanket cylinder showing the device of the present invention applied to the blanket cylinder, in full lines to the bearer surface, and in dotted lines to the blanket surface;

Figure 6 is an end view of the cylinders of Fig. 5 showing the device applied to the blanket cylinder and indicating also the impression cylinder;

Figure 7 is an enlarged view of the dial face shown in Fig. 5; and

Figure 8 is a diagrammatic view showing the relation of the contacting plate and blanket surfaces to the contacting bearer surfaces.

Referring in detail to the illustrative construction shown in the drawings, and in accordance with the present invention, the numeral 11 indicates a magnetic base or bridge member that is constructed of steel or iron and comprises a pair of parallel longitudinal runners 12 having parallel registering longitudinal edges 13. The runners 12 mounts between them a permanent magnet, or, in this instance, two such permanent magnets 14 which are desirably formed of an aluminum-nickel-cobalt alloy preferably known as Alnico V. The magnets 14 are secured to the runners 12 by machine screws 15 that enter tapped ends in tie rods 15a that pass through a suitable pasageway in the magnets and the bolts also secure the runners together through the intermediation of the magnets. The magnets 14 are set back or upwardly of the runner lower edges 13, which latter are cut away intermediately as at 13a to reduce the area of contact.

At each end of the bridge member 11 are a pair of rest yokes 16 of non-magnetic material such as cast brass or bronze secured to the runners 12 as by screws 17 and projecting above the runners as shown. As here shown, each of the rests 16 is formed with a lug 18 that is tapped to receive a set-screw 19 that screws down upon and secures to the runners 12 a top or cover plate 20, also advantageously of brass or other non-magnetic material. The lower end of each rest yoke 16 that is between the runners is enlarged as at 16a to reinforce the frame structure of the bridge member and incidentally to provide a shoulder 16b on which the top plate 20 rests.

In accordance with the present invention, the non-magnetic rests 16 are slotted at their upper ends by a machine operation as at 21 to receive the longitudinally extending bar 22 that is desirably of precision machined steel of a low coefficient of expansion so as to be substantially unaltered in shape and size by heat or cold. Since in this instance the bar 22 is slidable in the rest yokes, and is also separable therefrom it is desirable that its lower edge 23, particularly, maintains a smooth uniformly plane surface parallel with lower edges 13 of the bridge sides 12. For this purpose the lower ends of the slots 21 are somewhat circularly milled out as at 24, and to secure or maintain this parallelism, there is here provided an adjusting rest means best illustrated in Fig. 2 that guards against interference therewith by direct dirt or other foreign particles. As there shown, each of the slots 21 for its rest 16 is intersected, at its bottom 24, by a tapped hole 25 that communicates with a counterbore 26 that opens into the lower end 27 of the rest yoke 16, this lower end 27 being spaced above the lower edges 13 of the runner 12. An adjustable machine set-screw 28 is screwed upwardly into the tapped hole 25, the head 29 of the set-screw being freely rotatably and longitudinally movable within limits in the counterbore 26. Knurled knob 30 on the head 29 provides for readily making small manual adjustments of at least one of the screws 28. As indicated in Fig. 2, the screw is adjusted upwardly so as to provide in effect an auxiliary bottom for the slot 21 by means of the end 31 of the adjustment screw, upon which the bar 22 may rest, to regulate the parallelism of the lower edge 23 of the bar with the lower edges 13 of the runners 12 of the bridge member. A coil spring 32 surrounding the screw 28 and compressed between its head 29 and the end of the counterbore 26 spring-loads the screw so as to inhibit accidental rotation thereof due to vibration on other movement of the device. The upper end 31 of the adjustable screw 28 is well tapered as shown, and this cooperating with the cutout 24 minimizes the area of contact with the bar 22 and facilitates the avoidance of interference by foreign matter in said area.

Turning now to the parts carried by the bar 22 and further following the present invention, at one end the bar carries a head 32 suitably rigidly secured to the bar, this head having a bifurcated lower outer corner 33. In the bifurcation 33 of the head 32 is entered the knuckle 34 of a dog 35 that is pivoted to the head for limited up and down movement with respect thereto, and for this purpose a pivot pin 35a passes through the furcations of the head and through the knuckle 34. The dog is flanged on each side as at 36, these flanges being normally parallel with but slightly spaced from the end face 37 of the head. By abutment of the flanges 36 with the face 37, pivotal movement of the dog 35 with respect to the head is limited to the play afforded by the space 36a between the face 37 and the flanges 36 which thus act as stops. A compression coil spring 38 located in a recess 38a between the furcations 33 of the head, presses on the dog 35 and so urges the latter downwardly within the limit of its pivotal movement already described. The dog 35 at its outer end has a vertically extending barrel portion 39 that at its lower end has screwed thereinto the gauge finger 40, by means of a threaded shank 40a on the gauge finger cooperating with the tapped bore 42 of the barrel 39. A locking nut 41 screwed on the shank 40a fixes the degree of entry of the gauge finger 40 into the barrel 39 thus permitting a semi-permanent adjustment of the over-all length of the dog 35.

At its upper end the barrel 39 is internally threaded as at 43 to have screwed thereinto the threaded shank of the adjustable pin 45 that has a knurled flange 46 permitting ready adjustment thereof in the barrel 39. A compression coil spring 47 abutted at its lower end in a shallow depression in the upper end of the shank 40a presses at its upper end against a portion 44 of the lower end of pin 45, the latter having a depending stud 49 that enters the spring 47 to stabilize the latter. In this instance, the gauge finger 40 terminates at its lower end in a contact roller 50 that is rotatable on an arbor 51 journaled in the bifurcated lower end of the gauge finger 40.

The head 32, above the dog 35, is extended upwardly in a standard 52 that terminates in a bearing 53 that receives the support stem 54 of a gauge dial instrument 55. Securement of the stem 54 in the bearing 53 is maintained by the set screw 56 screwed into the boss 57 at the upper end of the standard 52 above the bearing 53 and that has a shank 58 that intersects the stem 54.

The dial indicator instrument 55 has the usual plunger 59 terminating in a button 60 that is adapted to abut the upper end of the pin 45, it being understood that the plunger 59 is spring pressed downwardly and is arranged to actuate a dial hand 61 by mechanism which is conventional to such dial instruments and need not be here further described. As best seen in Fig. 7, the dial instrument 55 has a dial face 62 and two sets of numerals thereon that are graduated from the zero point 63 by increments of a thousandth of an inch, plus and minus, the plus graduation being in this instance arranged clockwise of the dial face and the minus calculation being arranged counterclockwise.

So constructed and arranged, it will be seen that when the pin 45 is held in contact with the plunger 59 of the dial instrument, and by turning the knurled flange 46 of the pin, the dial may be calibrated so as to bring the hand 61 of the dial to the zero point 63. Any subsequent movement of the dog 35 on its pivot 36 either upwardly or downwardly will cause movement of the dial finger 61 either clockwise or counterclockwise. If the dog 35 is moved upwardly the movement of the dial finger will be clockwise, that is, in a plus direction, while if the dog 35 is moved downwardly the movement of the dial finger will be in a counterclockwise or minus direction. It will be understood that the pin 45 should be adjusted to bring the dial finger to the zero position while the dog still has play in the space 36a for movement both upwardly and downwardly.

Operation of the device is as follows:

With the bar 22 either carried by or separated from the bridge member 11, the latter is placed against the cylinder the packing of which is to be measured. For example, as shown in Figs. 5 and 6 the device is placed against the blanket cylinder for the verifying of the thickness of the blanket packing 64 (Fig. 8). The permanent magnet 14 strongly attracts the metal core 65 (Fig. 6) of the blanket cylinder, and the device is thus adhered to the outer face of the blanket cylinder, the paper of the packing and the rubber of the blanket not interfering with the establishment of the accompanying magnetic flux. The magnets are sufficiently powerful so that the device will remain on the face of the cylinder even though the device desirably (for reading the dial) extends horizontally therefrom somewhat in cantilever fashion. If for convenience of first attaching the bridge member to the cylinder the bar 22 has been preliminarily removed from the bridge member 11, the bar is then placed in the rest yokes 16, which being of non-magnetic material as previously described, permit free movement of the bar therein in a longitudinal direction. The bar is then adjusted to bring the dog 35 over the surface 66 of the bearer 67, and, since small increments of measurement are here involved, the contact roller 50 of the gauge finger 40 will normally contact this surface 66 while there is still play in the space 36a for either upward or downward movement of the dog 35. If such play is not already permitted the finger 40 may be adjusted for that purpose. The bar 22 may be slid along the bridge member, in the rest yokes, to bring the dial mechanism to a proper position over the surface 66. It will be understood that the spring 38 urges the dog downwardly toward the surface 66 with the contact roller 50 engaging the surface 66. The pin 45 is then rotated to bring the hand 61 of the dial instrument 55 to the zero position of the dial. This is the initial reading. Thereupon, to remove the gauge finger 40 from the surface 66, the bar 22 is lifted from the bridge member 11. Since the rest yokes 16 are non-magnetic this may be easily done. The bar 22 is then reversed in direction and reset on the rest yokes 16, in reversed position thereon, as indicated in Fig. 5, with the dial mechanism projecting therebeyond toward the left, instead of toward the right as when the dial mechanism was used for taking the zero measurement of the surface 66 of the bearer 67. With the dial mechanism in this position the dog 35, through the intermediation of its contact roller 50, will contact the surface 68 of the blanket cylinder which, as indicated in Figs. 1 and 8 and in accordance with good practice, should be slightly higher (preferably .002 inch as previously referred to) than the bearer surface 66. To determine whether this is the case, the dog 35 will move slightly upwardly on its pivot 36 sufficient to move the dial plunger 59 sufficient to move the dial pointer 61 in a clockwise or plus direction and to the figure "2" on the dial which will indicate a relative elevation of .002 inch for the surface 68 above the surface 66.

A similar calculation may then be made on the plate cylinder 69, the measurement in the latter case being taken on the printing plate itself which may occupy a portion only, such as 70, for example, of the circumference of the plate cylinder 69. Thus the thickness of the packing 71 of the plate cylinder may also be measured by ascertaining the height of the plate surface above the height of the surface of the bearer for the plate cylinder. (See Figs. 5 and 8).

If there is room to slide the bar 22 to cause the gauge finger 40 (through the contact roller 50) to contact the surface 68 immediately adjacent the bearer surface 66 that could be done instead of reversing the bar, but it is generally more desirable to take the measurement of the relative height of the surface 68 with respect to the surface 66 at a point farther removed from the bearer surface and nearer the longitudinal center of the cylinder.

Figure 8 shows somewhat diagrammatically how the cylinders may contact on their bearer surfaces while at the same time the height, spaced axially from the bearer, of the cylinder surfaces may be somewhat higher, the latter surfaces being momentarily squeezed as the contact of the cylinders is made, this squeeze, and the degree of it, being important to a proper transfer of the printing impression. Such squeeze is permitted by the resilience of the rubber surface of the blanket.

The curvature of the cylinders is accommodated by the bridge member 11 by the fact that the cross elements of the bridge member, such as the magnets 14 and the rest yokes 16, terminate substantially above the lower edges 13 of the runners 12 of the bridge member. This curvature is further accommodated by the fact that the edges 13 are transversely beveled or curved as at 72, further assuring suitable attachment of the bridge member to the cylinder surface, until the test has been completed, after which the device may be removed, and if the packing measurement be found correct, the printing run may be begun.

Since the pull of the magnets 14 is quite strong, there are here shown notches 72a opening into the cutaway portions 13a in the lower edges of the runners 12 into which a screw driver or other tool may be inserted to pry the bridge away from the cylinder when the test is completed.

It will be understood by those skilled in the art, that if a good printing image is transferred from the inked plate to the blanket of the blanket cylinder a good printing impression will then be assured when the paper to be printed upon, indicated at 73, is run between the blanket cylinder 65a and the impression cylinder 74 (Fig. 6).

The invention is not intended to be limited to details of construction shown for purposes of exemplification. An illustrative embodiment having been described, in accordance with the statute, such adaptations, including modifications or additions, may be made as incorporate what is defined in any appended claim without departing from the invention.

What is here claimed is:

1. A magnetic surface gauge of the class described, comprising, a magnetic bridge member adapted to hold itself to a magnetically permeable structure having surfaces of different heights, non-magnetic rests upstanding from said bridge, a bar of greater length than the bridge mounted on said rests and movable thereon, a dial indicator carried at one end of said bar, and a resilient finger depending from said bar below said indicator in operative relation to said indicator, whereby said finger without moving said bridge member may be contacted successively with different ones of said surfaces to indicate on the dial the relative heights thereof.

2. The gauge of claim 1 wherein the bar is reversible end for end on said rests.

3. The gauge of claim 1 wherein the rests are slotted to receive the bar.

4. The gauge of claim 1 wherein the bridge member carries a pair of permanent magnets.

5. The gauge of claim 1 wherein the bridge member carries a permanent magnet of an aluminum-nickel-cobalt alloy.

6. The gauge of claim 1 wherein the bridge member includes a pair of spaced apart runners that support the magnets between them and said magnets are set back from the lower edges of the runners.

7. The gauge of claim 7 wherein the said edges are beveled.

8. The structure of claim 3 wherein there is an adjustable set screw in one of said slots to adjust the parallelism of the bar with the bridge member.

9. A rest for a gauge of the class described, comprising, a yoke having a slot therein, a tapped hole intersecting the bottom of said slot, said hole communicating with a counterbore opening into the lower end of said yoke, a set screw screwed upwardly into said hole having its head in said counterbore, and a loading spring abutted between said head and the upper end of said counterbore.

10. A rest for a gauge of the class described, comprising, a rest member having a slot therein, said slot being curvilinearly enlarged at its inner end, a tapped hole communicating with said enlargement and a set screw screwed into said tapped hole having an end projected into said enlargement intersecting the latter, said end being tapered.

11. A surface gauge of the class described, comprising, a magnetic bridge member adapted to hold itself to a cylindrical structure having surfaces of different heights, said bridge member comprising a pair of parallel longitudinal runners spaced apart transversely of the bridge member, permanent magnet means carried by said runners extending between the runners spaced above the lower edge of the runners, a cover plate for said runners, rest members mounted on said member and extending above said cover plate spaced apart in the direction of the axis of the structure, a bar carried on said rest members extending in the direction of said axis, a dial indicator carried at one end of said bar, and a finger carried by said end of the bar for gauging the relative heights of said surfaces, said finger cooperating with said dial indicator.

12. In a surface gauge of the class described, a magnetic member comprising a pair of longitudinally extending parallel runners having downwardly projecting edges whereby both runners can contact a curved surface while extending in the direction of the axis of said surface, longitudinally spaced apart rest means mounted on said member, a bar carried by said rest means and gauge means carried by said bar overhanging one end of said magnetic member, said gauge means including a dial indicator and a finger depending below said indicator in operative relation to said indicator, said finger being mounted for bodily up and down movement with respect to the bar and being also selectively extensible and retractable independently of said bodily movement.

13. A magnetic surface gauge of the class described, comprising, a bridge member adapted to hold itself to a curved structure having surfaces of different heights, said bridge member including a pair of parallel runners and a pair of permanent magnets secured to and between said runners spaced above the lower edges thereof, non-magnetic rests upstanding from said bridge member, a bar mounted on said rests, a dial indicator carried at one end of said bar, and a gauge finger depending from said bar below said indicator in operative relation to said indicator.

14. A magnetic surface gauge of the class described, comprising, a magnetic bridge member adapted to hold itself to a cylindrical structure having surfaces of different heights, non-magnetic rests upstanding from said bridge member, a bar spanning and mounted on said rests and movable thereon, a dial indicator carried at one end of said bar, and a finger depending from said bar below said indicator in operative relation to said dial indicator whereby said finger may be moved with said bar without moving said bridge member and may be contacted successively with different ones of said surfaces to indicate on the dial the relative heights of said surface, said finger being spring pressed downwardly toward one of said surfaces.

References Cited in the file of this patent

UNITED STATES PATENTS

| | | |
|---|---|---|
| 464,290 | Taylor | Dec. 1, 1891 |
| 793,027 | Burton et al. | June 20, 1905 |
| 842,044 | Wells et al. | Jan. 22, 1907 |
| 1,683,710 | Zitzmann | Sept. 11, 1928 |
| 1,888,454 | Edson | Nov. 22, 1932 |
| 1,996,323 | Chase et al. | Apr. 2, 1935 |
| 2,130,269 | Dietert | Sept. 13, 1938 |
| 2,547,717 | Polk et al. | Apr. 3, 1951 |
| 2,704,890 | Welsch | Mar. 29, 1955 |